May 19, 1970 F. H. VAN WINSEN 3,512,800
SUSPENSION OF AN AUXILIARY FRAME AT THE MAIN FRAME
OF A VEHICLE, ESPECIALLY OF A MOTOR VEHICLE
Filed July 13, 1967
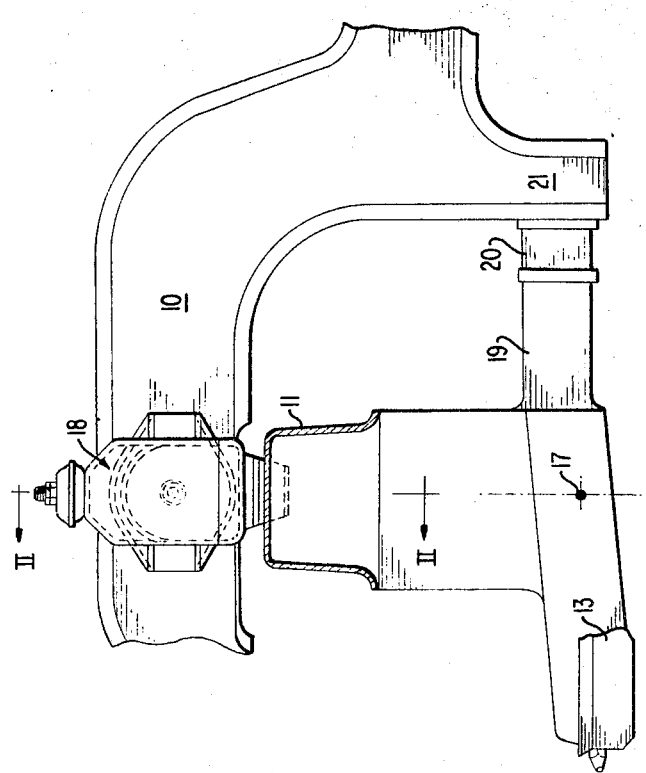
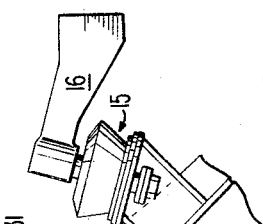
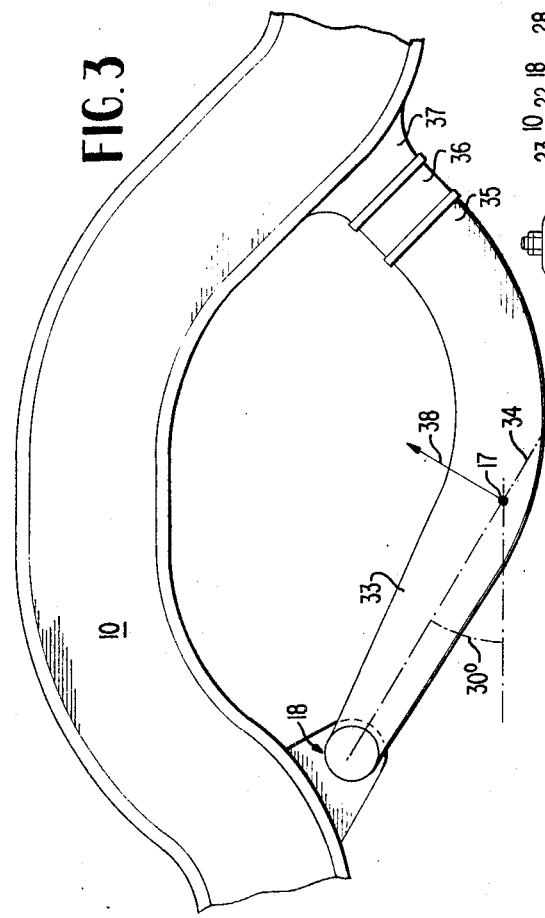
INVENTOR
FRIEDRICH H. VAN WINSEN
BY Dicke & Craig
ATTORNEYS United States Patent Office 3,512,800
Patented May 19, 1970

3,512,800
SUSPENSION OF AN AUXILIARY FRAME AT THE MAIN FRAME OF A VEHICLE, ESPECIALLY OF A MOTOR VEHICLE
Friedrich H. van Winsen, Kirchheim, Teck, Germany, assignor to Daimler-Benz Aktiengesellschaft, Stuttgart-Unterturkheim, Germany
Filed July 13, 1967, Ser. No. 653,267
Claims priority, application, Germany, July 14, 1966, D 50,563
Int. Cl. B60g 9/00
U.S. Cl. 280—106.5                                15 Claims

ABSTRACT OF THE DISCLOSURE

A suspension for an auxiliary frame on the main frame of a vehicle, especially of a motor vehicle, in which the driving engine is adapted to be supported by elastic means on the auxiliary frame and the auxiliary frame also receives the wheel suspension parts, in which the auxiliary frame is elastically connected to the main frame by elastic bearings in a hinge-like manner in two points located above a plane parallel to the road surface and passing through the wheel axes, and in which the auxiliary frame is additionally supported at the main frame, preferably by elastic bearings adapted to be stressed under compression, at a point located at a considerable distance in the longitudinal direction—as viewed in the driving direction—from the hinge-like support. The elastic bearings producing the hinge-like supports may be so constructed and arranged as to preclude substantially all lateral movements in the direction of their bearing axis as well as all movements in a direction perpendicular thereto while permitting substantially only pivotal movements about the bearing axis.

BACKGROUND OF THE INVENTION

The present invention relates to the suspension of an auxiliary frame at the main frame of a vehicle, especially of a motor vehicle, whereby the auxiliary frame is supported in two points at the main frame by elastic means within a vehicle transverse plane and is supported with respect thereto by other means, and whereby the auxiliary frame, in its turn, receives the wheel suspension and the driving engine of the vehicle is supported on the auxiliary frame by elastic means.

The aforementioned type of suspensions is known generally under the term "driving stool." With the known constructions of this type, the support of the auxiliary frame at the main frame is realized essentially in the manner of a pot-shaped rubber bearing having an approximately vertical or upright bearing axis. This type of auxiliary frame suspension which is advantageous from an assembly point of view entails, however, the disadvantage that it permitted lateral movements of the auxiliary frame. Consequently, an additional lateral support of the auxiliary frame at the main frame was necessary in the prior art constructions.

SUMMARY OF THE INVENTION

The present invention aims at an improvement in this direction to the underlying problem. It is thereby to be achieved that the auxiliary frame exhibits an accurate guidance about the vehicle longitudinal axis, about the vehicle upright or vertical axis and in the lateral directions. Additionally, it is intended to be realized that the auxiliary frame is able to carry out spring movements with respect to the main frame in the vehicle longitudinal direction.

The underlying problems are solved according to the present invention with the arrangements mentioned hereinabove in that the auxiliary frame is supported in a hinge-like manner at the main frame by two essentially cylindrical rubber bearings having at least approximately transversely disposed axes above the plane parallel to the road surface and extending through the wheel axes and—as viewed in side view—is supported at the main frame in a place as far removed as possible from this support in at least one point. If reference is made hereinabove to a hinge-like bearing support, then this reference is intended to bring out the fact that the cylindrical rubber bearings enable essentially only rotating movements. In contradistinction thereto, they are to be as unyielding as possible with respect to all forces which are directed in the direction of their own bearing axes or at right angle thereto.

The auxiliary frame suspension according to the present invention offers the advantage that lateral forces can now be transmitted from the main frame to the auxiliary frame so that an additional lateral support becomes superfluous. Additionally, the auxiliary frame now can no longer carry out any pivotal movements about the vehicle longitudinal axis. Finally, the significant advantage is realized by the present invention that by reason of the soft longitudinal spring system of the auxiliary frame, the wheels can deflect in the longitudinal direction. As a result thereof, shocks and impacts on the wheels are absorbed in an improved manner.

Vehicles are known in the prior art having a main frame whose longitudinal bearers extend approximately in the shape of a U above the auxiliary frame. With these types of vehicles, the last-mentioned advantage becomes particularly apparent, if, according to a preferred construction of the present invention, the two rubber bearings are disposed essentially vertically above the wheel axes in the upwardly extending longitudinal bearer section above the auxiliary frame. Movements in the vertical direction are then practically impossible so that the engine stroke movements cannot be influenced. Critical resonances during the vertical spring movements of the entire vehicle are avoided thereby.

With one construction according to the present invention, two rearwardly directed arms pointing rearwardly in the driving direction—as viewed in side view—are arranged at the auxiliary frame with respect to its bearing support at the main frame, and these arms are resiliently or elastically supported at the main frame. The arms themselves can be secured at the auxiliary frame or may only be pivotally connected thereto. Rubber cushions or buffers are utilized advantageously for the elastic support which are stressed essentially in compression. With another construction according to the present invention, the auxiliary frame is supported at the main frame by two pull rods or tie rods supported in rubber.

In order to assist the rolling-off movements of the wheels, it may also be appropriate if, according to a further embodiment of the present invention, the hinge-like bearing support of the auxiliary frame is disposed in a plane inclined approximately at 30° with respect to the road surface and extending from the wheel axes forwardly and upwardly. It is thereby quite appropriate—with the main frame construction mentioned hereinabove—if the auxiliary frame—as viewed in side view—has a shape curved opposite to the main frame and is elastically or yieldingly supported at the main frame to the rear of the wheel axes. Rubber cushions or rubber buffers of any conventional construction are also appropriately utilized therefor which are stressed in compression.

With this construction it is possible to adapt advantageously the main movability of the auxiliary frame about its hinge-like bearing support approximately to the impact direction on the wheels. It is only important in connection therewith that the hinge-like bearing support is located always above but not in the plane through the wheel axis parallel to the road surface. In such a case, the other advantages described above could no longer be realized.

The present invention preferably contemplates that the two cylindrical rubber bearings are located on the same vehicle transverse axis which, at the same time is the longitudinal bearing axis thereof. Of course, it is also within the scope of the present invention to incline, from case to case, the bearing axis with respect to the aforementioned transverse axis by slight amounts. It is possible in this manner to locate the direction determinative for the bearing of the hardest resistance into every desired direction relative to the vehicle.

The construction of the rubber bearing itself is left to the discretion of a person skilled in the art. However, the present invention prefers a solution according to which each rubber bearing consists of two rubber bushes which are arranged in a mirror-image-like manner to one another within a bushing or sleeve, formed by the longitudinal bearer, on a bolt connected with the auxiliary frame and which are provided externally with flange portions that are adapted to be pressed against the bushing or sleeve by the parts of the auxiliary frame receiving the bolt. One is thereby in a position to place the rubber bearings under prestress at will by tightening the auxiliary frame parts which prestress can be adjusted to any desired value. The flange parts may be present already on each part of the rubber bearings either beforehand or they are produced by the aforementioned prestress.

Appropriately, the bolt is thereby rigidly connected with a pressure plate on the outside of the vehicle which pressure plate, in its turn, is operatively connected with the end of the auxiliary frame open in the downward direction which may serve simultaneously as abutment for a spring leg. Two bushings vulcanized to the rubber bearings are then arranged on the bolt according to the present invention, and the bolt is secured on the vehicle inside in a counter plate which is secured on a mount or small bracket of the auxiliary frame. The bearing support of the auxiliary frame and the support of the spring leg or of other wheel guide parts is thereby combined by the construction proposed in accordance with the present invention in an advantageous, space-saving type and manner.

It is already known in the prior art to provide tubular parts for the pivotal connection of the wheel guide members at the auxiliary frame. The present invention proposes in connection therewith that these tubular parts are constructively included in the support of the auxiliary frame. Thus, it is quite possible to utilize these tubular parts at the same time for the pivotal connection of the support members. For example, the forwardly directed pull rods or also the rearwardly directed support arms may be secured at these tubular parts. The securing takes place appropriately always by means of conventional rubber bearings. Equally appropriately, these support members also extend in the direction of the tubular parts themselves or they only have slight angular deviations with respect thereto.

Accordingly, it is an object of the present invention to provide a suspension of an auxiliary frame at the main frame of a vehicle which eliminates by simple means the aforementioned shortcomings and drawbacks encountered with the prior art constructions.

A further object of the present invention resides in the suspension of an auxiliary frame at the main frame of a motor vehicle in which lateral movements of the auxiliary frame are practically precluded.

A still further object of the present invention resides in a suspension of an auxiliary frame at the main frame of a motor vehicle which results in great simplification of the construction thereof while at the same time offering significant advantages from a driving point of view.

A further object of the present invention resides in a suspension of an auxiliary frame at the main frame which produces an exact guidance of the auxiliary frame about the vehicle longitudinal axis and the vehicle upright axis, as well as in the lateral directions.

Still a further object of the present invention resides in a suspension of an auxiliary frame at the main frame in which the auxiliary frame is able to yield elastically with respect to the main frame in the vehicle longitudinal direction.

Still another object of the present invention resides in a suspension for the auxiliary frame at the main frame of a motor vehicle which improves the ability to absorb shocks and impacts on the roads.

A still further object of the present invention resides in a suspension of an auxiliary frame at the main frame of motor vehicles in which critical resonances in the vertical spring movements of the over-all vehicle are effectively avoided.

A further object of the present invention resides in a suspension for the auxiliary frame at the main frame of vehicles which permits a compact as well as space-saving construction of the parts thereof.

These and other objects, features, and advantages of the present invention will become more obvious from the following description when taken in connection with the accompanying drawing which shows, for purposes of illustration only, two embodiments in accordance with the present invention, and wherein:

FIG. 1 is a schematic side elevational view of an auxiliary frame suspension in accordance with the present invention;

FIG. 2 is a partial cross-sectional view taken along line II—II of FIG. 1 showing the auxiliary frame suspension of FIG. 1 partly in cross section and partly in elevation; and FIG. 3 is a schematic side-elevational view of a modified embodiment of an auxiliary frame suspension in accordance with the present invention.

Referring now to the drawing wherein like reference numerals are used throughout the various views to designate like parts, and more particularly to FIG. 1 and 2, the longituidnal bearers designated therein by reference numeral 10 of the main frame extend approximately in a U-shaped manner above the auxiliary frame 11. The auxiliary frame includes a center section (not shown) extending approximately parallel to the road surface from which its lateral arms 12 extend upwardly at an inclination. The wheel guide members 13 and 14 are pivotally connected in any conventional manner at these lateral arms 12. Additionally, the driving engine (not shown) of the motor vehicle is supported on the auxiliary frame by means of rubber bearings generally designated by reference numeral 15 with the aid of feet or base parts 16.

The auxiliary frame 11 is supported at the main frame by means of two cylindrical rubber bearings generally designated by reference numeral 18 which are located vertically above the wheel axes 17. Two rearwardly extending arms 19 are secured at the auxiliary frame 11—as far removed from the bearing support 18 as possible—which are supported with respect to an extension 21 of the longitudinal bearer 10 of the main frame by means of rubber cushions 20 of conventional construction which are stressed in compression.

The longitudinal bearers 10 are apertured in a sleeve- or bushing-shaped manner for the accommodation of the bearings 18. Two rubber bush cushions 22 and 23 are inserted into these apertures in a mirror-image-like manner to each other. The rubber cushions 22 and 23 are provided inwardly thereof with bushings 24 and 25 vulcanized thereto, by means of which they are supported on a hollow bolt 26. The hollow bolt 26 connects a pressure plate 27 with a counterplate 28. The former is secured at the bolt 26 by welding or any other similar manner and is additionally connected in any suitable manner with the pot-shaped end 29 of the auxiliary frame 12 which, as already mentioned, may serve as abutment for a spring leg 30. The counter plate 28 is bolted to a small bracket 31 which is welded to the auxiliary frame 12.

It is believed obvious that the two bearings 18 are extraordinarily stiff in a force direction transverse to their bearing axes. Consequently, they act as hinge-like bearing supports for the auxiliary frame 12. For purposes of suppressing lateral movements, the rubber blocks 22 and 23 are provided with flanges 32 which are pressed inbetween the sleeve-shaped eye of the longitudinal bearer 10 and the pressure plate 27 and the counter plate 28, respectively, under corresponding prestress. By the selection of the length of the inwardly vulcanized rubber bushings 24 and 25, one is therefore in a position to place these flange parts under a desired prestress. Furthermore, these flange parts 32 need not be present at the rubber blocks 23 and 24 beforehand. It would also be feasible to achieve the same exclusively by tightening the two plates 27 and 28 against the longitudinal bearer 10. However, in every case, they render the bearing 18 extra ordinarily rigid or stiff in the direction of their bearing axis. Consequently, the bearing support according to the present invention is capable of transmitting lateral forces from the longitudinal bearer 10 to the auxiliary frame 12 and vice versa.

According to FIG. 3, the bearing support generally designated by reference numeral 18 of the auxiliary frame 33 at the longitudinal bearers 10 is located in a plane 34 which extends forwardly and upwardly at an angle of 30° with respect to the road surface and passes through the wheel axis 17. The auxiliary frame 33 has a form and shape that curves in a direction opposite to that of the longitudinal bearer 10. The auxiliary frame 33 is supported at its rear end 35 by means of rubber cushions 36 with respect to an extension 37 of the longitudinal bearers 10. The rubber cushions 36 are stressed essentially in compression.

Also in this embodiment, the bearing support 18 is effective in a hinge-like manner. The main direction of movement of the auxiliary frame 33 extends in this construction in the direction of the arrow 38, i.e., it corresponds approximately to the impact direction on the wheel. This produces a particularly favorable spring support whereby the other advantages, for example, as regards rigidity or stiffness in the lateral direction, remain fully preserved.

While I have shown and described two embodiments in accordance with the present invention, it is understood that the same is not limited thereto but is susceptible of numerous changes as known to a person skilled in the art. For example, while reference is made hereinabove to rubber bearings and rubber cushions, it is understood that any other material may be used having analogous properties. Furthermore, the particular shape of the individual parts may be modified at will as known to a person skilled in the art.

Thus, it is obvious that the present invention is not limited to the details shown and described herein but is susceptible of numerous changes and modifications within the scope of a person skilled in the art, and 1 therefore do not wish to be limited to the details shown and described herein but intend to cover all such changes and modifications.

I claim:

1. A suspension for an auxiliary frame means at the main frame of a motor vehicle, comprising main frame means, auxiliary frame means adapted to accommodate the vehicle wheel suspension and to support the vehicle driving engine thereon, by way of elastic means, and means for supporting said auxiliary frame means at said main frame means to substantially preclude movement of said auxiliary frame means means about the longitudinal and vertical axes of the vehicle and in the lateral directions, including bearing means comprising two essentially cylindrically-shaped elastic means having at least approximately transversely-disposed axes located above a plane extending through the vehicle wheel axis and parallel to the road surface, and further support means for supporting said auxiliary frame means at said main frame means in at least one additional point located as far distant as possible from said essentially cylindrically-shaped elastic means.

2. A suspension according to claim 1, wherein the main frame means includes longitudinal bearer means extending in an approximately U-shaped manner above the auxiliary frame means, the two elastic bearing means being disposed essentially vertically above the wheel axes in the upwardly extending longitudinal bearer sections above the auxiliary frame means.

3. A suspension according to claim 2, wherein the further support means includes two arm means arranged at the auxiliary frame means and extending rearwardly in the driving direction with respect to the elastic bearing means of the auxiliary frame means at the main frame means, and means elastically supporting said arm means at said main frame means.

4. A suspension according to claim 2, wherein the auxiliary frame means is supported at the main frame means by two elastically supported tie rod means forming part of said further support means.

5. A suspension according to claim 1, wherein the two elastic bearing means are located a common vehicle transverse plane which simultaneously includes the longitudinal bearing axis thereof.

6. A suspension according to claim 5, wherein each elastic bearing means includes two elastic bush means arranged with respect to each other in a mirror-image-like manner within a sleeve constituted by a longitudinal bearer of the main frame means on a hollow bolt connected with the auxiliary frame means, and wherein the two elastic bush means are provided externally with flange portions which are adapted to be pressed against the sleeve by the parts of the auxiliary frame means receiving the hollow bolt.

7. A suspension according to claim 6, wherein the bolt is rigidly connected on the vehicle outside with a pressure plate which, in its turn, is operatively connected with the upright part of the auxiliary frame means open in the downward direction and serving simultaneously as abutment for a spring leg.

8. A suspension according to claim 7, wherein two bushings are arranged on the bolt which are vulcanized to the elastic bearing means, and wherein the bolt on the vehicle inside is secured in a counterplate which is secured on a small bracket of the auxiliary frame means.

9. A suspension according to claim 6, wherein two bushings are arranged on the bolt which are vulcanized to the elastic bearing means, and wherein the bolt on the vehicle inside is secured in a counterplate which is secured on a small bracket of the auxiliary frame means.

10. A suspension according to claim 8, wherein the main frame means includes longitudinal bearer means extending in an approximately U-shaped manner above the auxiliary frame means, the two elastic bearing means being disposed essentially vertically above the wheel axes in the upwardly extending longitudinal bearer sections above the auxiliary frame means.

11. A suspension according to claim 10, wherein the further support means includes two arm means arranged at the auxiliary frame means and extending rearwardly in the driving direction with respect to the elastic bearing means of the auxiliary frame means at the main frame means, and means elastically supporting said arm means at said main frame means.

12. A suspension according to claim 10, wherein the auxiliary frame means is supported at the main frame means by two elastically supported tie rod means forming part of said further support means.

13. A suspension according to claim 1, wherein each elastic bearing means includes two elastic bush means arranged with respect to each other in a mirror-image-like manner within a sleeve constituted by a longitudinal bearer of the main frame means on a hollow bolt connected with the auxiliary frame means, and wherein the two elastic bush means are provided externally with flange portions which are adapted to be pressed against the sleeve by the parts of the auxiliary frame means receiving the hollow bolt.

14. A suspension according to claim 13, wherein the bolt is rigidly connected on the vehicle outside with a pressure plate which, in its turn, is operatively connected with the upright part of the auxiliary frame means open in the downward direction and serving simultaneously as abutment for a spring leg.

15. A suspension according to claim 14, wherein two bushings are arranged on the bolt which are vulcanized to the elastic bearing means, and wherein the bolt on the vehicle inside is secured in a counterplate which is secured on a small bracket of the auxiliary frame means.

References Cited

UNITED STATES PATENTS

| | | | |
|---|---|---|---|
| 2,888,269 | 5/1959 | Hogsten | 280—106.5 |
| 2,733,933 | 2/1956 | Kishline | 280—106 |
| 3,139,152 | 6/1964 | Bajer | 180—64 |
| 3,093,390 | 6/1963 | Muller | 280—106.5 |

PHILIP GOODMAN, Primary Examiner